(12) United States Patent
Stolikj et al.

(10) Patent No.: US 10,417,527 B2
(45) Date of Patent: Sep. 17, 2019

(54) IDENTIFYING AN OBJECT WITHIN CONTENT

(71) Applicant: IRDETO B.V., Hoofddorp (NL)

(72) Inventors: Milosh Stolikj, Hoofddorp (NL); Dmitri Jarnikov, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 107 days.

(21) Appl. No.: 15/696,228

(22) Filed: Sep. 6, 2017

(65) Prior Publication Data

US 2019/0073562 A1   Mar. 7, 2019

(51) Int. Cl.
| | |
|---|---|
| *G06K 9/00* | (2006.01) |
| *G06F 17/30* | (2006.01) |
| *G06K 9/62* | (2006.01) |
| *G10L 25/51* | (2013.01) |
| *G10L 25/78* | (2013.01) |
| *G06K 9/46* | (2006.01) |
| *G06N 3/04* | (2006.01) |

(Continued)

(52) U.S. Cl.
CPC ....... *G06K 9/6256* (2013.01); *G06K 9/00228* (2013.01); *G06K 9/00288* (2013.01); *G06K 9/00711* (2013.01); *G06K 9/4628* (2013.01); *G06K 9/6274* (2013.01); *G10L 25/51* (2013.01); *G10L 25/78* (2013.01); *G06F 16/5854* (2019.01); *G06K 2209/25* (2013.01); *G06K 2209/27* (2013.01); *G06N 3/04* (2013.01); *G10L 15/16* (2013.01)

(58) Field of Classification Search
USPC ........ 382/100, 103, 106–107, 118, 138, 154, 382/155, 157, 162, 168, 173, 181, 199, 382/209, 219, 224, 232, 254, 274, 276, 382/286–291, 305, 312; 707/741, 735
See application file for complete search history.

(56) References Cited

U.S. PATENT DOCUMENTS

| | | | | |
|---|---|---|---|---|
| 2015/0347859 | A1* | 12/2015 | Dixon | G06K 9/186 |
| | | | | 382/138 |
| 2015/0347861 | A1* | 12/2015 | Doepke | H04N 5/23245 |
| | | | | 382/199 |

(Continued)

FOREIGN PATENT DOCUMENTS

WO   2017/134519 A1   8/2017

OTHER PUBLICATIONS

International Search Report and Written Opinion dated Dec. 20, 2018, in connection with International Application No. PCT/EP2018/073370, 17 pages.

(Continued)

*Primary Examiner* — Seyed H Azarian
(74) *Attorney, Agent, or Firm* — Rimon PC

(57) ABSTRACT

A method for identifying an object within a video sequence, wherein the video sequence comprises a sequence of images, wherein the method comprises, for each of one or more images of the sequence of images: using a first neural network to determine whether or not an object of a predetermined type is depicted within the image; and in response to the first neural network determining that an object of the predetermined type is depicted within the image, using an ensemble of second neural networks to identify the object determined as being depicted within the image.

18 Claims, 6 Drawing Sheets

(51) Int. Cl.
  *G06F 16/583*  (2019.01)
  *G10L 15/16*  (2006.01)

(56) References Cited

U.S. PATENT DOCUMENTS

| | | | | |
|---|---|---|---|---|
| 2016/0140146 A1* | 5/2016 | Wexler | .................. | G06K 9/18 |
| | | | | 707/741 |
| 2016/0148079 A1* | 5/2016 | Shen | .................. | G06K 9/4628 |
| | | | | 382/157 |
| 2017/0185872 A1* | 6/2017 | Chakraborty | ............ | G06K 9/66 |
| 2017/0300754 A1* | 10/2017 | Ohm | .................. | G06K 9/6273 |

OTHER PUBLICATIONS

Rawat et al., "Deep Convolutional Neural Networks for Image Classification: A Comprehensive Review", vol. 29, No. 9, Aug. 23, 2017, pp. 2352-2449.
D. Leporini, "Architectures and Protocols Powering Illegal Content Streaming Over the Internet", 2015, 7 pages.
Zhu, Guangyu, et al., "Automatic Document Logo Detection", Institute for Advanced Computer Studies, 5 pages.
Lu, Chang-Yu, et al., "Automatic logo transition detection in digital video contents", Pattern Anal Applic, Mar. 24, 2012, 13 pages.
Wang, Jinqiao, et al., "Automatic TV Logo Detection, Tracking and Removal in Broadcast Video", Institute of Automation & Institute for Infocomm Research, 10 pages.
Ioffe, Sergey, et al., "Batch Normalization: Accelerating Deep Network Training by Reducing Internal Covariate Shift", Mar. 2, 2015, 11 pages.
Razavian, Ali Sharif, et al., "CNN Features off-the-shelf: an Astounding Baseline for Recognition", Royal Institute of Technology, May 12, 2014, 8 pages.
Parkhi, Omkar M., et al., "Deep Face Recognition", Visual Geometry Group, 2015, 12 pages.
He, Kaiming, et al., "Deep Residual Learning for Image Recognition", Microsoft Research, Dec. 10, 2015, 12 pages.
Landola, Forrest N., et al., "DeepLogo: Hitting Logo Recognition with the Deep Neural Network Hammer", ASPIRE Laboratory, Oct. 7, 2015, 12 pages.
Yang, Fan, et al., "Feature Fusion by Similarity Regression for Logo Retrieval", 8 pages.
Szegedy, Christian, et al., "Going deeper with convolutions", Sep. 17, 2014, 12 pages.
Yosinski, Jason, et al., "Flow transferable are features in deep neural networks?", 9 pages.
Yosinski, Jason, et al., "Supplementary material for: How transferable are features in deep neural networks?", Nov. 6, 2014, 5 pages.
"Keras: Deep Learning library for Python", Runs on TensorFlow, retrieved from <<https://web.archive.org/web/20170804012212/https://github.com/fchollet/keras>>, 4 pages.
He, Kaiming, et al., "Identity Mappings in Deep Residual Networks", Jul. 25, 2016, 15 pages.
Krizhevsky, Alex, et al., "ImageNet Classification with Deep Convolutional Neural Networks", pp. 1-9.
Russakovsky, Olga, et al., "ImageNet Large Scale Visual Recognition Challenge", vol. 115, Apr. 11, 2015, pp. 211-252.
Russakovsky, Olga, et al., "ImageNet Large Scale Visual Recognition Challenge", Jan. 30, 2015, pp. 1-43.
Karpathy, Andrej, et al., "Large-scale Video Classification with Convolutional Neural Networks", 8 pages.
Li, Kuo-Wei, et al., "Logo detection with extendibility and discrimination", vol. 72, Apr. 11, 2013, pp. 1285-1310.
Boia, Raluca, et al., "Logo localization and recognition in natural images using homographic class graphs", Machine Vision and Applications, vol. 27, 2016, pp. 287-301.
E. Francesconi, et al., "Logo Recognition by Recursive Neural Networks", 8 pages.
Hoi, Steven C.H., et al., "LOGO-Net: Large-scale Deep Logo Detection and Brand Recognition with Deep Region-based Convolutional Networks", Nov. 13, 2015, 15 pages.
Lowe, David G., et al., "Object Recognition from Local Scale-Invariant Features", Proc. of the International Conference on Computer Vision, Corfu, Sep. 1999, pp. 1-8.
Adelson, E. H., et al., "Pyramid methods in image processing", RCA Engineer 29-6, Nov./Dec. 1984, pp. 33-41.
Romberg, Stefan, et al., "Scalable Logo Recognition in Real-World Images", Proceedings of ACM International Conference on Multimedia Retrieval, 2011, ACM, 8 pages.
Al-Rfou, Rami, et al., "Theano: A Python framework for fast computation of mathematical expressions", May 9, 2016 pp. 1-19.
Bagdanov, Andrew D., et al., "Trademark Matching and Retrieval in Sport Video Databases", 9th ACM SIGMM International Workshop on Multimedia Information Retrieval, ACM, Sep. 28-29, 2007, pp. 1-17.
Moosavi-Dezfooli, Seyed-Mohsen, et al., "Universal adversarial perturbations", Mar. 9, 2017, pp. 1-11.
Simonyan, Karen, et al., "Very Deep Convolutional Networks for Large-Scale Image Recognition", Apr. 10, 2015, pp. 1-14.

* cited by examiner

IDENTIFYING AN OBJECT WITHIN CONTENT

FIELD OF THE INVENTION

The present invention relates to methods, systems and computer programs for identifying an object within content.

BACKGROUND OF THE INVENTION

It is often desirable to be able to identify particular objects or patterns or characteristics within content (such as images, video sequences and audio content). This can be carried out for activities such as facial recognition, logo detection, product placement, voice recognition, etc. Various systems currently exist to enable such identification.

It would, however, be desirable to provide improved object identification, in terms of speed and accuracy of the results.

SUMMARY OF THE INVENTION

According to a first aspect of the invention, there is provided a method for identifying an object within a video sequence, wherein the video sequence comprises a sequence of images, wherein the method comprises, for each of one or more images of the sequence of images: using a first neural network to determine whether or not an object of a predetermined type is depicted within the image; and in response to the first neural network determining that an object of the predetermined type is depicted within the image, using an ensemble of second neural networks to identify the object determined as being depicted within the image.

The first neural network may be a convolutional neural network or a deep convolutional neural network.

One or more of the second neural networks may be a convolutional neural network or a deep convolutional neural network.

In some embodiments, using a first neural network to determine whether or not an object of a predetermined type is depicted within the image comprises: generating a plurality of candidate images from the image; using the first neural network to determine, for each of the candidate images, an indication of whether or not an object of the predetermined type is depicted in said candidate image; and using the indications to determine whether or not an object of the predetermined type is depicted within the image. One or more of the candidate images may be generated from the image by performing one or more geometric transformations on an area of the image.

The predetermined type may, for example, be a logo, a face or a person.

In some embodiments, the method comprises associating metadata with the image based on the identified object.

According to a second aspect of the invention, there is provided a method of determining unauthorized use of a video sequence, the method comprising: obtaining a video sequence from a source; and using according to any embodiment of the first aspect, when the predetermined type is a logo, to identify whether or not a logo is depicted within one or more images of the video sequence. The logo may be one of a plurality of predetermined logos.

According to a third aspect of the invention, there is provided a method for identifying an object within an amount of content, the method comprising: using a first neural network to determine whether or not an object of a predetermined type is depicted within the amount of content; and in response to the first neural network determining that an object of the predetermined type is depicted within the amount of content, using an ensemble of second neural networks to identify the object determined as being depicted within the amount of content.

The amount of content may be an image or an audio snippet.

The first neural network may be a convolutional neural network or a deep convolutional neural network.

One or more of the second neural networks may be a convolutional neural network or a deep convolutional neural network.

In some embodiments, using a first neural network to determine whether or not an object of a predetermined type is depicted within the amount of content comprises: generating a plurality of content candidates from the amount of content; using the first neural network to determine, for each of the content candidates, an indication of whether or not an object of the predetermined type is depicted in said content candidate; and using the indications to determine whether or not an object of the predetermined type is depicted within the amount of content. The one or more of the content candidates may be generated from the amount of content by performing one or more geometric transformations on a portion of the amount of content.

In some embodiments, the amount of content is an audio snippet and the predetermined type is one of: a voice; a word; a phrase.

In some embodiments, the method comprises associating metadata with the amount of content based on the identified object.

According to a fourth aspect of the invention, there is provided an apparatus arranged to carry out a method according to any embodiment of the first to third aspects of the invention.

In particular, there may be provided a system for identifying an object within a video sequence, wherein the video sequence comprises a sequence of images, wherein the system comprises: an input arranged to receive an image of the sequence of images; first neural network arranged to determine whether or not an object of a predetermined type is depicted within the image; an ensemble of second neural networks, the ensemble arranged to, in response to the first neural network determining that an object of the predetermined type is depicted within the image, identify the object determined as being depicted within the image.

The first neural network may be a convolutional neural network or a deep convolutional neural network.

One or more of the second neural networks may be a convolutional neural network or a deep convolutional neural network.

In some embodiments, the system comprises a candidate image generator arranged to generate a plurality of candidate images from the image, wherein the first neural network is arranged to determine whether or not an object of a predetermined type is depicted within the image by: determining, for each of the candidate images, an indication of whether or not an object of the predetermined type is depicted in said candidate image; and using the indications to determine whether or not an object of the predetermined type is depicted within the image. One or more of the candidate images may be generated from the image by performing one or more geometric transformations on an area of the image.

The predetermined type may, for example, be a logo, a face or a person.

In some embodiments, the system is arranged to associate metadata with the image based on the identified object.

There may be provided a system arranged to determine unauthorized use of a video sequence, the system comprising: an input for obtaining a video sequence from a source; and a system as set out above, arranged to identify whether or not a logo is depicted within one or more images of the video sequence. The logo may be one of a plurality of predetermined logos.

There may be provided a system for identifying an object within an amount of content, the system comprising: a first neural network arranged to determine whether or not an object of a predetermined type is depicted within the amount of content; and an ensemble of second neural networks, the ensemble arranged, in response to the first neural network determining that an object of the predetermined type is depicted within the amount of content, to identify the object determined as being depicted within the amount of content.

The amount of content may be an image or an audio snippet.

The first neural network may be a convolutional neural network or a deep convolutional neural network.

One or more of the second neural networks may be a convolutional neural network or a deep convolutional neural network.

In some embodiments, the system comprises a candidate generator arranged to generate a plurality of content candidates from the amount of content, wherein the first neural network is arranged to determine whether or not an object of a predetermined type is depicted within the amount of content by: using the first neural network to determine, for each of the content candidates, an indication of whether or not an object of the predetermined type is depicted in said content candidate; and using the indications to determine whether or not an object of the predetermined type is depicted within the amount of content. The one or more of the content candidates may be generated from the amount of content by performing one or more geometric transformations on a portion of the amount of content.

In some embodiments, the amount of content is an audio snippet and the predetermined type is one of: a voice; a word; a phrase.

In some embodiments, the system is arranged to associate metadata with the amount of content based on the identified object.

According to a fifth aspect of the invention, there is provided a computer program which, when executed by one or more processors, causes the one or more processors to carry out a method according to any embodiment of the first to third aspects of the invention. The computer program may be stored on a computer-readable medium.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—System Overview

Figure 1:
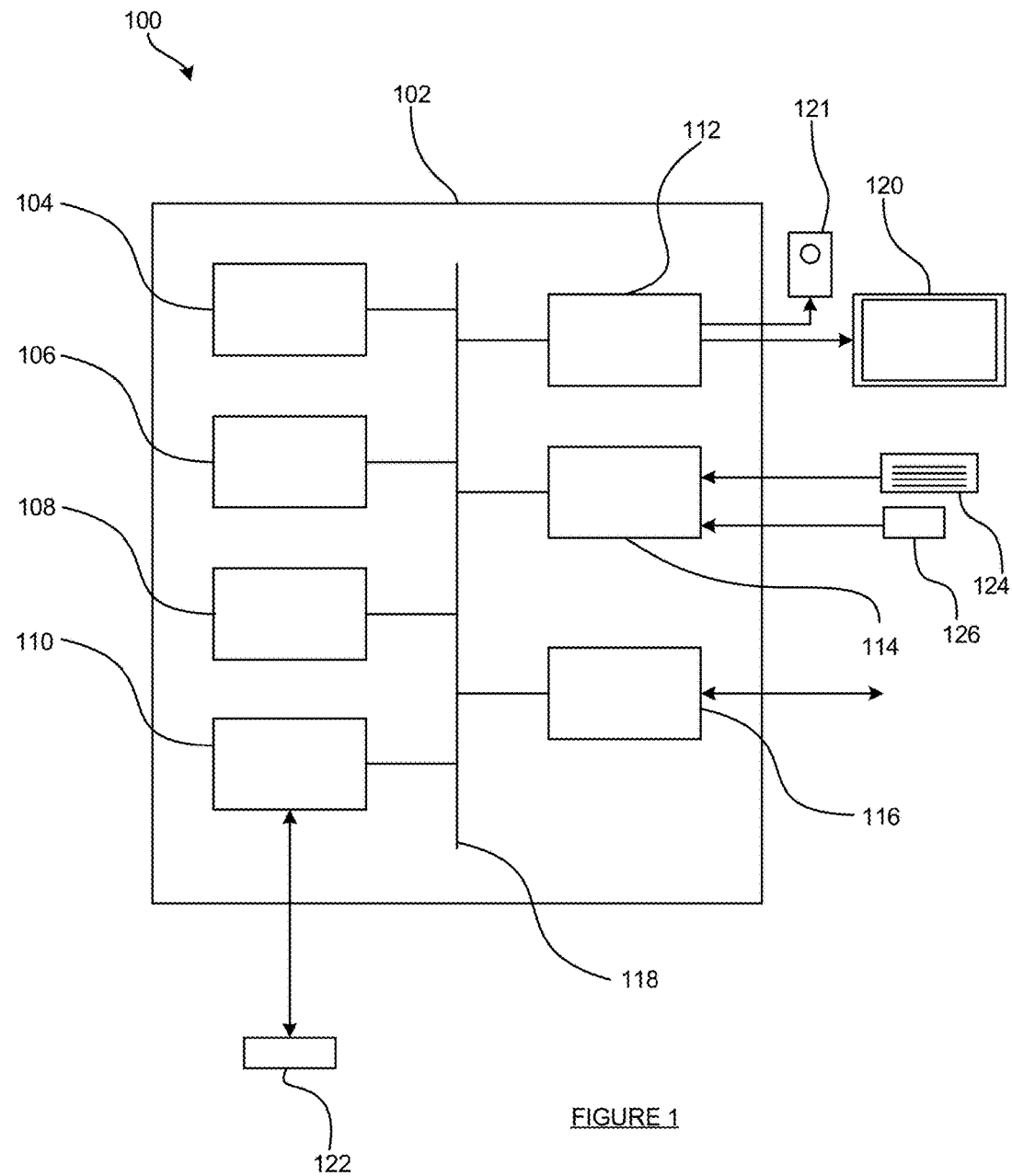
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which may be linked together over one or more communication buses 118.

The storage medium 104 may be any form of non-volatile data storage device such as one or more of a hard disk drive, a magnetic disc, a solid-state-storage device, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc.

Figure 2:
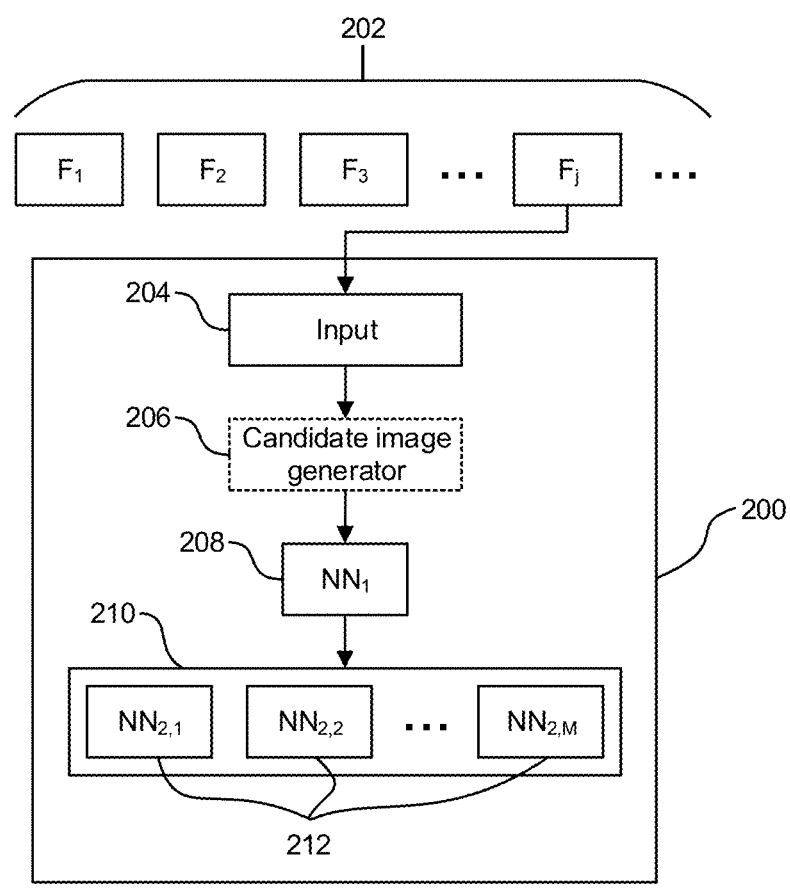
FIG. 2 schematically illustrates a system according to some embodiments of the invention.

FIG. 2 schematically illustrates a system 200 according to an embodiment of the invention. The system 200 may be used to detect and identify an object (or feature or pattern) depicted in (or represented in or present in) a video sequence. The system 200 is concerned with detecting and identifying objects of a predetermined type (i.e. objects that belong to a particular/specific class/group/category of objects). Therefore, the system 200 may be configured for a corresponding predetermined type of object, i.e. one embodiment of the system 200 may be configured for a first predetermined type of object, whilst a different embodiment of the system 200 may be configured for a second, different, predetermined type of object.

For example, the object may be a logo of a television broadcaster, which is often depicted in (or overlaid onto) broadcast television images (usually in one of the corners of the images). In this example, the predetermined type of object may be "broadcaster logo in general and the video sequence may be, for example, a television broadcast. The system 200 may then be arranged to detect whether an object of the predetermined type (i.e. a broadcaster logo) is depicted in the television broadcast and, if so, to then identify which particular object (i.e. which particular broadcaster logo) is depicted in the television broadcast. Other example scenarios of different types of object are possible, as shall be discussed in more detail later.

For ease of understanding, in the following, embodiments of the invention shall sometimes be described with reference to the predetermined type of object being "broadcaster logo", as discussed above. However, it will be appreciated that embodiments of the invention are not restricted to this predetermined type of object.

The system 200 comprises an input 204, a first neural network 208, an ensemble 210 of second neural networks 212, and an optional candidate image generator 206. For ease of reference, the first neural network 208 shall be referred to as $NN_1$. As shown in FIG. 2, the ensemble 210 of second neural networks 212 comprises (or makes use of, or is a collection or group of) a plurality of second neural networks 212. The number of second neural networks 212 shall be referred to herein as M (for some integer M>1) and, for ease of reference, the second neural networks 212 shall be referred to respectively as $NN_{2,k}$ (k=1, 2, ..., M). The system 200 may be implemented, for example, using one or more computer systems 100 of FIG. 1.

The input 204 is arranged to receive images of a video sequence 202. The video sequence 202 comprises a sequence (or series) of images $F_k$ (k=1, 2, 3, ...). Each image $F_k$ (k≥1) may be, for example, a video frame or one of two video fields of a video frame, as are known in this field of technology. The images $F_k$ (k≥1) may be at any resolution (such as at the resolution for any of the NTSC, PAL and high definition standards).

As shall be described in more detail below, the system 200 processes the video sequence 202 on an image-by-image basis, i.e. each image $F_k$ (k=1, 2, 3, ...) of the video sequence 202 may be processed independently from the other images of the video sequence 202. Thus, in FIG. 2, and in the subsequent discussion, the image from the video sequence 202 currently processed by the system 200 is the image $F_j$ (for some integer j≥1), also referred to as the "current image".

The input 204 may take many forms. For example:

The video sequence 202 may be part of a television broadcast, video-on-demand, pay TV, etc., in which case, the input 204 may comprise, or may make use of, a television receiver for receiving a television signal (such as a terrestrial television broadcast, a digital video broadcast, a cable television signal, a satellite television signal, etc.).

The video sequence 202 may be video distributed over a network (such as the Internet), in which case the input 204 may comprise, or may make use of, one or more network connections (such as the network interface 116) for connecting to a network (such as the Internet) so that video can be acquired or obtained via that network.

The video sequence 202 may be stored on a medium local to the system 200 (such as the storage medium 104), with the input 204 being arranged to read images from the video sequence 202 stored on the medium.

The candidate image generator 206 is arranged to generate a plurality of candidate images $C_k$ (k=1, 2, ..., N) based on the current image $F_j$ (for some integer N>1). One of the candidate images $C_k$ may be the same as the current image $F_j$. The subsequent processing for the current image $F_j$ is then based on the candidate images $C_k$ (k=1, 2, ..., N). The operation of the candidate image generator 206 shall be described in more detail shortly with reference to FIG. 5.

However, as mentioned, the candidate image generator 206 is optional. Thus, in some embodiments that do not utilize the candidate image generator 206, a plurality of candidate images $C_k$ is not generated—instead, the subsequent processing is based only on the current image $F_j$. Thus, in the following, the number of candidate images may be viewed as 1 (i.e. N=1), with $C_1$ equal to $F_j$, i.e. the current image $F_j$ may be considered to be a candidate image $C_1$ (and, indeed, the only candidate image).

The first neural network $NN_1$ is responsible for determining (or detecting or identifying) whether or not an object of a predetermined type is depicted within the current image $F_j$. The first neural network $NN_1$ carries out this processing based on the candidate image(s) $C_k$ (k=1, 2, . . . , N). If an object of the predetermined type is determined as being depicted within the current image $F_j$, then the ensemble 210 of second neural networks $NN_{2,k}$ (k=1, 2, . . . , M) is responsible for identifying (or classifying or recognising) the object that has been determined as being depicted within the current image $F_j$. Thus, in the example of the predetermined type of object being "broadcaster logo", the first neural network $NN_1$ is responsible for determining whether or not a broadcaster logo is depicted in an image $F_j$ from a television broadcast and, if so, the ensemble 210 of second neural networks $NN_{2,k}$ (k=1, 2, . . . , M) is responsible for identifying which particular broadcaster logo is depicted within the current image $F_j$.

The first neural network $NN_1$ and each of the second neural networks $NN_{2,k}$ (k=1, 2, . . . , M) may be any kind of neural network. Preferably, each of $NN_1$ and $NN_{2,k}$ (k=1, 2, . . . , M) is a convolutional neural network (CNN) or, more preferably, a deep CNN, because these types of neural networks have been shown to be particularly well-suited to image analysis tasks. CNNs are well-known (see, for example, https://en.wikipedia.org/wiki/Convolutional_neural_network, the entire disclosure of which is incorporated herein by reference) and they shall not, therefore, be described in more detail herein. Examples of CNN architectures that embodiments of the invention may use for $NN_1$ and $NN_{2,k}$ (k=1, 2, . . . , M) include:

The AlexNet architecture (see, A. Krizhevsky, I. Sutskever, and G. E. Hinton, "*ImageNet Classification with Deep Convolutional Neural Networks*" in Advances in Neural Information Processing Systems 25, F. Pereira, C. J. C. Burges, L. Bottou, and K. Q. Weinberger, Eds. Curran Associates, Inc., 2012, pp. 1097-1105 and http://papers.nips.cc/paper/4824-imagenet-classification-with-deep-convolutional-neural-networks.pdf, the entire disclosure of which is incorporated herein by reference). AlexNet consists of five convolutional layers and three fully connected dense layers.

The VGGNet architecture (see K. Simonyan and A. Zisserman, "*Very deep convolutional networks for large-scale image recognition*", CoRR, vol. abs/1409.1556, 2014 and http://arxiv.org/abs/1409.1556, the entire disclosure of which is incorporated herein by reference). VGGNet consists of 13 convolutional and 3 fully connected dense layers, with a regular structure. In VGGNet, the basic building block consists of two or three stacked convolutional layers of the same size, followed by a 2×2 MaxPooling layer. This building block is repeated five times, with the number of filters doubling from 64 up to 512 filters per channel in the last block.

The ResNet architecture (see K. He, X. Zhang, S. Ren, and J. Sun, "*Deep residual learning for image recognition*" CoRR, vol. abs/1512.03385, 2015 and http://arxiv.org/abs/1512.03385, the entire disclosure of which is incorporated herein by reference). ResNet has a homogeneous structure, which consists of stacked residual blocks. Each residual block consists of two stacked convolutional layers, with the input to the residual block, despite going to the first convolutional layer, also added to the output of the residual block.

It will be appreciated that modifications to the AlexNet, VGGNet and ResNet architectures are possible to arrive at other CNN architectures. It will also be appreciated that other CNN architectures are possible.

Each of the second neural networks $NN_{2,k}$ (k=1, 2, . . . , M) is different from the other second neural networks $NN_{2,b}$ (b=1, 2, . . . , M, b≠k), in that: (i) $NN_{2,k}$ uses its own respective neural network architecture that is different from the architecture for $NN_{2,b}$ and/or (ii) $NN_{2,k}$ was trained/initialized using a different training set of samples than that used for $NN_{2,b}$.

Thus, the ensemble 210 may obtain results from each of the different second neural networks $NN_{2,k}$ (k=1, 2, . . . , M) and use those results to provide a final output corresponding to the current image $F_j$. Ensembles of neural networks, and ways to combine outputs from multiple neural networks to obtain a single output for a task, are well-known (see, for example, https://en.wikipedia.org/wiki/Ensemble_averaging_(machine_learning), the entire disclosure of which is incorporated herein by reference) and they shall not, therefore, be described in more detail herein except where useful for further understanding of embodiments of the invention.

The architecture used for the first neural network $NN_1$ may be the same as the architecture used for one or more of the second neural networks $NN_{2,k}$ (k=1, 2, . . . , M) or may be different from the architecture used for all of the second neural networks $NN_{2,k}$ (k=1, 2, . . . , M). However, as discussed below, given the different tasks that the first neural network $NN_1$ and the ensemble 210 of second neural networks $NN_{2,k}$ (k=1, 2, . . . , M) have to perform, they are trained using different respective training sets of samples.

2—Neural Network Training

As is well-known in the field of neural networks, a neural network needs to be trained for it to carry out a specific task, with the training based on samples.

Each of the second neural networks $NN_{2,k}$ (k=1, 2, . . . , M) is, as discussed above, to be used to identifying an object that has been determined as being depicted within the current image $F_j$. It is, therefore, assumed that there is a set of particular objects of the predetermined type that the system 200 is to be used to try to identify. Let the number of such objects be represented by T, and this set of particular objects of the predetermined type be $\{O_1, O_2, \ldots, O_T\}$. Indeed, specifying the set of objects $\{O_1, O_2, \ldots, O_T\}$ of interest may, in itself, define the predetermine type of object. For example, continuing the "broadcaster logo" example, there may be T broadcaster logos which the system 200 is intended to identify/discriminate, and object $O_k$ (k=1, 2, . . . , T) is the $k^{th}$ broadcaster logo.

A first set of samples $S_1$ may be generated, where each sample in $S_1$ is an image depicting one of the objects $O_k$ (k=1, 2, . . . , T), and, for each object $O_k$ (k=1, 2, . . . , T), $S_1$ comprises a plurality of images depicting that object $O_k$. The set of samples $S_1$ therefore has T "classes" or "types" of sample (one for each object $O_k$ (k=1, 2, . . . , T)). Each second neural network $NN_{2,k}$ (k=1, 2, . . . , M) may be trained based on this set of samples $S_1$. The skilled person will appreciate that the number of images depicting each object $O_k$ (k=1, 2, . . . , T) within the set of samples $S_1$ may be chosen to be sufficiently large so that the training of each second neural network $NN_{2,k}$ (k=1, 2, . . . , M) is successful. For example, each of the T classes of samples for the set of samples $S_1$ may comprise around 5000 samples. Thus, each of the second neural networks $NN_{2,k}$ (k=1, 2, ..., M) is trained to distinguish between, or identify, the T specific objects as depicted in input images.

In some embodiments, each image in the set of samples $S_1$ may be generated by: (1) obtaining an image depicting one of the objects $O_k$ (k=1, 2, ... T); (2) identifying where in the image the object $O_k$ is depicted; and (3) generating the sample by cropping a fixed size part of the image around the object $O_k$. Such samples shall be called "padded samples". This results in samples having the same dimensions, regardless of which object $O_k$ is depicted therein. Step (2) may be carried out manually, or may be automated (e.g. in the "broadcaster logo" example, the location of the logo object $O_k$ for a particular broadcaster may be known to be a predetermined position within an image).

In some embodiments, each image in the set of samples $S_1$ may be generated by: (1) obtaining an image depicting one of the objects $O_k$ (k=1, 2, ... T); (2) identifying where in the image the object $O_k$ is depicted; and (3) generating the sample by cropping a fixed size area/border around/from the object $O_k$. Such samples shall be called "non-padded samples". This results in samples having the same aspect ratio as the object $O_k$ depicted therein, although different samples may then have different aspect ratios. Step (2) may be carried out manually, or may be automated (e.g. in the "broadcaster logo" example, the location of the logo object $O_k$ for a particular broadcaster may be known to be a predetermined position within an image).

In some embodiments, both padded and non-padded samples may be used in the set of samples $S_1$. It will also be appreciated that the set of samples $S_1$ may comprise samples generated by other means (e.g. by simply using the original images that depict the object $O_k$) in addition to, or as alternatives to, the padded and/or non-padded samples.

Figure 3:
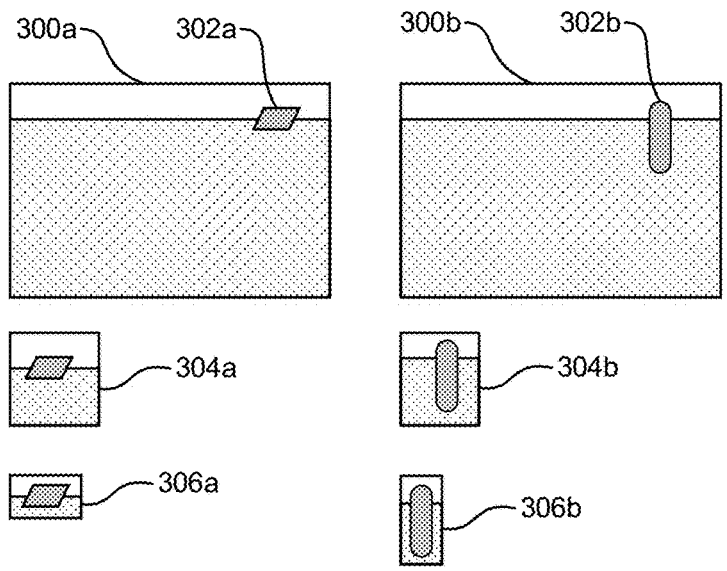
FIG. 3 schematically illustrates example samples for training neural networks according to some embodiments of the invention.

FIG. 3 schematically illustrates the above-mentioned samples. Two original images 300a, 300b are illustrated, that each depict a corresponding object 302a, 302b of the predetermined type. Padded samples 304a, 304b may be generated which, as can be seen, have the same aspect ratio and the same overall size regardless of the object depicted therein. Non-padded samples 306a, 306b may be generated which, as can be seen, have different aspect ratios (due to the different dimensions of the objects 302a, 302b), but have a same sized boundary around the objects 302a, 302b.

In some embodiments, additional samples in the set of samples $S_1$ may be generated by, for example, (i) applying one or more geometric transformations (such as a rotation, shear, scaling (zoom-in or zoom-out)) to the original images 300a, 300b and generating padded samples and/or non-padded samples from the transformed images, so that samples depicting the objects $O_k$ (k=1, 2, ..., T) in different transformed configurations are obtained; and/or (ii) adjusting where, within the sample, the object $O_k$ (k=1, 2, ..., T) is located (e.g. instead of being centred within the sample, the object $O_k$ could be offset from the centre of the sample).

It will be appreciated that each second neural network $NN_{2,k}$ (k=1, 2, ..., M) may be trained using its own respective set of samples $S_1$ as opposed to them all being trained using the same set of samples $S_1$.

The first neural network $NN_1$ is, as discussed above, to be used to determine whether or not an object of the predetermined type is depicted within the current image $F_j$ (without consideration of which particular object $O_k$ (k=1, 2 ..., T) is depicted). A second set of samples $S_2$ may be generated, where the second set of samples $S_2$ comprises images without an object of the predetermined type depicted therein, and images with an object of the predetermined type depicted therein. The set of samples $S_2$ therefore has 2 "classes" or "types" of sample (a first class of samples that do not depict an object of the predetermined type, and a second class of samples that do depict an object of the predetermined type). Preferably, the second set of samples $S_2$ comprises, for each of the objects $O_k$ (k=1, 2, ... T), a plurality of images that depict that object $O_k$. The skilled person will appreciate that the number of images depicting an object of the predetermined type and the number of images not depicting an object of the predetermined type within the second set of samples $S_2$ may be chosen to be sufficiently large so that the training of the first neural network $NN_1$ is successful. For example, each of the 2 classes of samples for the set of samples $S_2$ may comprise around 5000T samples. Indeed, the second class for the second set of samples $S_2$ may comprise the first set of samples $S_1$—the first class for the second set of samples $S_2$ may then comprise a substantially similar number of samples as the second class for the second set of samples $S_2$. Thus, the first neural network $NN_1$ is trained to distinguish between, or identify, two types of image, namely images depicting an object of the predetermined type and images not depicting an object of the predetermined type.

For the second set of samples $S_2$, the samples that depict an object of the predetermined type (i.e. samples for the second class) may be obtained in a similar manner to the samples for the first set of samples $S_1$, for example by generating padded and/or non-padded samples as shown in FIG. 3.

It will be appreciated that the first and/or second sets of samples $S_1$ and $S_2$ may be generated in different ways, and that the first neural network $NN_1$ and/or the second neural networks $NN_{2,k}$ (k=1, 2, ..., M) may be trained in different ways so as to still be able to carry out their respective tasks.

3—Object Detection and Identification

Figure 4:
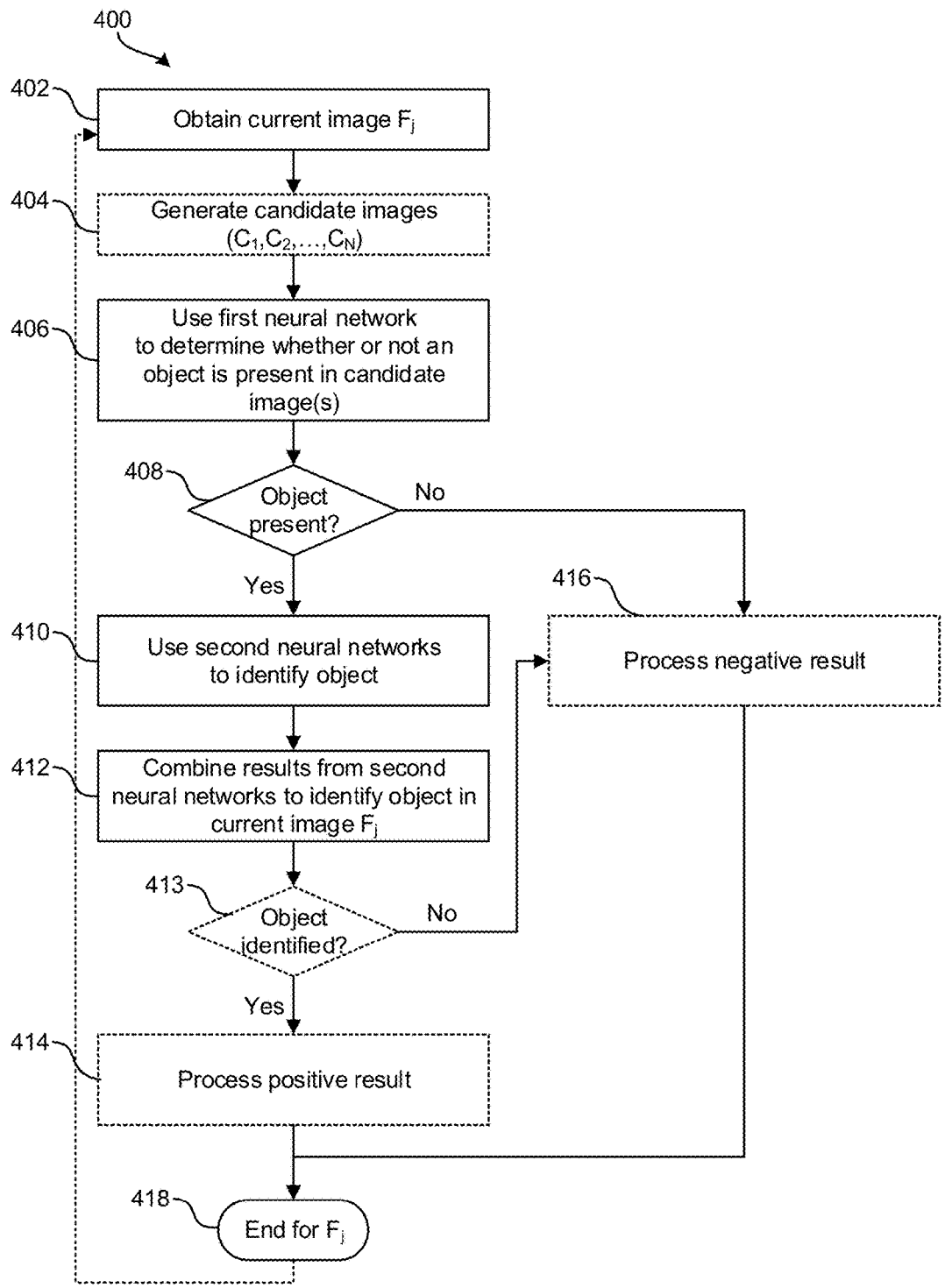
FIG. 4 is a flowchart illustrating a method of using the system of FIG. 2 according to some embodiments of the invention.

FIG. 4 is a flowchart illustrating a method 400 of using the system 200 of FIG. 2 according to some embodiments of the invention. The method 400 is a method for identifying an object within the video sequence 202. The method 400 may be carried out by a computer system 100 as described above with reference to FIG. 1. The method 400 assumes that the first neural network $NN_1$ and the second neural networks $NN_{2,k}$ (k=1, 2, ..., M) have been trained so as to be able to carry out their respective tasks, as discussed above.

At a step 402, the system 200 uses the input 204 to obtain the current image $F_j$ from the video sequence 202. The input 204 may actively obtain the image $F_j$ (e.g. extract an image from a broadcast television signal) or may be provided with an image $F_j$ (e.g. the system 200 may be instructed to test specific images $F_j$ that are provided to the system 200).

If the system 200 makes use of the candidate image generator 206 then the method 400 comprises a step 404 at which the candidate image generator 206 generates the plurality of candidate images $C_k$ (k=1, 2, ..., N). If the system 200 does not make use of the candidate image generator 206 then the method 400 does not comprises the step 404 and, instead, there is only one candidate image $C_1$ (i.e. N=1) which is the current image (i.e. $C_1=F_j$).

At a step 406, the first neural network $NN_1$ is used to determine whether or not an object of the predetermined type is depicted within the candidate image(s) $C_k$ (k=1, 2, ..., N). The step 406 comprises providing each of the candidate image(s) $C_k$ (k=1, 2, ..., N) as an input to the first neural network $NN_1$ and using the first neural network $NN_1$ to determine whether or not an object of the predetermined type is present in that candidate image $C_k$. Thus, for each candidate image $C_k$ (k=1, 2, ..., N), the first neural network $NN_1$ provides an indication of whether or not an object of the predetermined type is depicted in that candidate image $C_k$. Continuing the "broadcaster logo" example, at the step 406, the first neural network $NN_1$ is used to test each of the candidate image(s) $C_k$ (k=1, 2, ..., N) to check whether or not a broadcaster logo is present in that candidate image $C_k$.

Thus, the first neural network $NN_1$ produces a result $R_k$ for each candidate image $C_k$ (k=1, 2, ..., N). The result $R_k$ may take many forms. For example:

In some embodiments, $R_k$ assumes one of two values: either a first value $V_1$ (e.g. TRUE) to indicate that the candidate image $C_k$ depicts an object of the predetermined type or a second value $V_2$ (e.g. FALSE) to indicate that the candidate image $C_k$ does not depict an object of the predetermined type. An object of the predetermined type may therefore be determined to be depicted in the current image $F_j$ if $R_k = V_1$ for at least a threshold number $\beta_1$ of the candidate images $C_k$ (k=1, 2, ..., N). In some embodiments, the threshold number $\beta_1$ may be 1, so that detection by the first neural network $NN_1$ in a single candidate image $C_k$ (k=1, 2, ..., N) is sufficient to conclude that the current image $F_j$ depicts an object of the predetermined type. In some embodiments, the threshold number $\beta_1$ may be greater than 1.

In some embodiments, $R_k$ is a confidence value indicating a likelihood that the candidate image $C_k$ depicts an object of the predetermined type. For example, the confidence value may be in the range from 0 to 1. In the following, it is assumed that higher confidence values are indications of a higher likelihood that the candidate image $C_k$ depicts an object of the predetermined type—however, it will be appreciated that the opposite may be true, and that embodiments of the invention may be adapted accordingly. An object of the predetermined type may therefore be determined to be depicted in the current image $F_j$ if $R_k$ is greater than a predetermined threshold $\beta_2$ for at least a threshold number $\beta_1$ of the candidate images $C_k$ (k=1, 2, ..., N). In some embodiments, the threshold number $\beta_1$ may be 1, so that detection by the first neural network $NN_1$ in a single candidate image $C_k$ (k=1, 2, ..., N) is sufficient to conclude that the current image $F_j$ depicts an object of the predetermined type. In some embodiments, the threshold number $\beta_1$ may be greater than 1. Alternatively, an object of the predetermined type may be determined to be depicted in the current image $F_j$ if a combination of $R_k$ (k=1, 2, ..., N) is greater than a predetermined threshold $\beta_3$, e.g. if a product ($\Pi_{k=1}^{N} R_k$) or a linear combination ($\Sigma_{k=1}^{N} \theta_k R_k$ for some positive coefficients $\theta_k$) of the $R_k$ values exceeds $\beta_3$.

Thus, at a step 408, the system 200 uses the results of the step 406 to determine whether an object of the predetermined type is depicted in the current image $F_j$. This may be carried out in the manner set out above. However, it will be appreciated that the result $R_k$ corresponding to the candidate image $C_k$ (k=1, 2, ..., N) may take other forms, and that other methods could be used for using the results $R_k$ (k=1, 2, ..., N) to determine whether or not an object of the predetermined type is depicted in the current image $F_j$. Thus, together, the steps 406 and 408 involve using the first neural network $NN_1$ to determine whether or not an object of the predetermined type is depicted within the current image $F_j$.

If the system 200 determines that an object of the predetermined type is not depicted in the current image $F_j$, then processing continues at an optional step 416 at which the system 200 may carry out processing specific to the situation in which no object of the predetermined type is detected in the current image $F_j$. For example, the system 200 may expect to always detect an object of the predetermined type, so that failure to detect such an object may be viewed as an error or an anomaly which needs to be logged to flagged for further investigation. Processing then continues at a step 418, as discussed later.

If the system 200 determines that an object of the predetermined type is depicted in the current image $F_j$, then processing continues at a step 410. The step 410 is reached when there are one or more candidate images $C_k$ (k=1, 2, ..., N) in which the first neural network $NN_1$ had determined that an object of the predetermined type is depicted. Let there be L such candidate images $C_{k_1}, C_{k_2}, \ldots, C_{k_L}$ in which the first neural network $NN_1$ had determined that an object of the predetermined type is depicted. Let these candidate images $C_{k_b}$ (b=1, 2, ..., L) be called "positive candidate images". For example, in the above-mentioned embodiments in which $R_k$ assumes one of two values (either a first value $V_1$ (e.g. TRUE) to indicate that the candidate image $C_k$ depicts an object of the predetermined type or a second value $V_2$ (e.g. FALSE) to indicate that the candidate image $C_k$ does not depict an object of the predetermined type), the positive candidate images $C_{k_b}$ (b=1, 2, ..., L) are those candidate images $C_k$ for which $R_k = V_1$. Likewise, in the above-mentioned embodiments in which $R_k$ is a confidence value indicating a likelihood that the candidate image $C_k$ depicts an object of the predetermined type, the positive candidate images $C_{k_b}$ (b=1, 2, ..., L) are those candidate images $C_k$ for which $R_k$ is greater than $\beta_2$.

At the step 410, each of the second neural networks $NN_{2,k}$ (k=1, 2, ..., M) is used to identify which object of the predetermined type is depicted within each of the positive candidate images $C_{k_b}$ (b=1, 2, ..., L). The step 410 comprises, for each second neural network $NN_{2,k}$ (k=1, 2, ..., M), providing each of the positive candidate image(s) $C_{k_b}$ (b=1, 2, ..., L) as an input to that second neural network $NN_{2,k}$ and using that second neural network $NN_{2,k}$ to generate a corresponding result $S_{k,b}$. The result $S_{k,b}$ produced by the second neural network $NN_{2,k}$ for positive candidate image $C_{k_b}$ may take many forms. For example:

$S_{k,b}$ may be an indication of one object from the set of objects {$O_1, O_2, \ldots, O_T$} that the second neural network $NN_{2,k}$ determines to be the most likely object depicted in the positive candidate image $C_{k_b}$. The results $S_{k,b}$ (k=1, 2, ..., M; b=1, 2, ..., L) may then be combined by identifying an object most frequently indicated by the set of results {$S_{k,b}$: k=1, 2, ..., M; b=1, 2, ..., L}—this identified object may then be considered to be the object depicted in the current image $F_j$.

$S_{k,b}$ may comprise an indication of one object $O_{k,b}$ from the set of objects {$O_1, O_2, \ldots, O_T$} that the second neural network $NN_{2,k}$ determines to be the most likely object depicted in the positive candidate image $C_{k_b}$, together with an associated confidence value $\gamma_{k,b}$ (e.g. a number in the range 0 to 1) indicating a degree of confidence that it is that object $O_{k,b}$ that is depicted in the positive candidate image $C_{k_b}$. In the following, it is assumed that higher confidence values are indications of a higher likelihood that it is that object $O_{k,b}$ that is depicted in the positive candidate image $C_{k_b}$—however, it will be appreciated that the opposite may be true, and that embodiments of the invention may be adapted accordingly. The results $S_{k,b}$ (k=1, 2, ..., M; b=1, 2, ..., L) may then be combined in a number of ways. For example, the object $O_{k,b}$ with the highest confidence value $\gamma_{k,b}$ may be considered to be the object depicted in the current image $F_j$. Alternatively, for each object $O_x$ (x=1, 2, ..., T), a corresponding confidence value $\gamma_x$ for that object can be determined as the sum of the confidence values $\gamma_{k,b}$ for which $O_x=O_{k,b}$ (k=1, 2, ..., M; b=1, 2, ..., L)—then the object $O_x$ with the highest confidence value $\gamma_x$ may be considered to be the object depicted in the current image $F_j$.

$S_{k,b}$ may comprise an indication, for each object $O_x$ (x=1, 2, ..., T), an associated confidence value $\gamma_{k,b,x}$ (e.g. a number in the range 0 to 1) indicating a degree of confidence that it is that object $O_x$ that is depicted in the positive candidate image $C_{k_b}$. In the following, it is assumed that higher confidence values are indications of a higher likelihood that it is that object $O_x$ that is depicted in the positive candidate image $C_{k_b}$—however, it will be appreciated that the opposite may be true, and that embodiments of the invention may be adapted accordingly. The results $S_{k,b}$ (k=1, 2, ..., M; b=1, 2, ..., L) may then be combined in a number of ways. For example, for the object $O_x$ (x=1, 2, ..., T), an overall confidence value $\gamma_x$ for that object can be determined as a product ($\Pi_{k=1}^{M} \Pi_{b=1}^{L} \gamma_{k,b,x}$) or a linear combination ($\Sigma_{k=1}^{M} \Sigma_{b=1}^{L} \theta_{k,b} \gamma_{k,b,x}$) for some positive coefficients $\theta_{k,b}$ of the confidence values $\gamma_{k,b,x}$ (k=1, 2, ..., M; b=1, 2, ..., L). Then the object $O_x$ with the highest confidence value $\gamma_x$ may be considered to be the object depicted in the current image $F_j$.

Thus, at a step 412, the ensemble 210 combines the results $S_{k,b}$ from the second neural networks (k=1, 2, ..., M; b=1, 2, ..., L) to identify an object of the predetermined type in the current image $F_j$. This may be carried out in the manner set out above. However, it will be appreciated that the result $S_{k,b}$ (k=1, 2, ..., M; b=1, 2, ..., L) may take other forms, and that other methods could be used for using the results $S_{k,b}$ (k=1, 2, ..., M; b=1, 2, ..., L) to identify which object of the predetermined type is depicted in the current image $F_j$.

Thus, together, the steps 410 and 412 involve, in response to the first neural network $NN_1$ determining that an object of the predetermined type is depicted within the current image $F_j$, using the ensemble 210 of second neural networks $NN_{2,k}$ (k=1, 2, ..., M) to identify the object determined as being depicted within the current image $F_j$.

It will be appreciated that the step 410 may involve the second neural networks $NN_{2,k}$ (k=1, 2, ..., M) using candidate images $C_k$ other than, or in addition to, the positive candidate images. For example, the second neural networks $NN_{2,k}$ (k=1, 2, ..., M) may analyze all of the candidate images $C_k$ (k=1, 2, ..., N).

In some embodiments, at the step 412, the ensemble 210 may not be able to identify which object of the predetermined type is depicted in the current image $F_j$. For example, in the above-mentioned embodiment in which the object $O_{k,b}$ with the highest confidence value $\gamma_{k,b}$ is considered to be the object depicted in the current image $F_j$, such an embodiment may make use of a predetermined threshold for $\beta_4$ such that if that highest confidence value $\gamma_{k,b}$ exceeds $\beta_4$, then the object $O_{k,b}$ is identified whereas if that highest confidence value $\gamma_{k,b}$ does not exceed $\beta_4$ then the ensemble 210 does not identify any object as being depicted within the current image $F_j$ (so that object identification has not been successful). Likewise, in the above-mentioned embodiment in which the object $O_x$ with the highest confidence value $\gamma_x$ is considered to be the object depicted in the current image $F_j$, such an embodiment may make use of a predetermined threshold for $\beta_4$ such that if that highest confidence value $\gamma_x$ exceeds $\beta_4$, then the object $O_x$ is identified whereas if that highest confidence value $\gamma_x$ does not exceed $\beta_4$ then the ensemble 210 does not identify any object as being depicted within the current image $F_j$ (so that object identification has not been successful). It will be appreciated that other mechanisms for the ensemble 210 to determine whether the object identification has been successful could be used.

Thus, in some embodiments, at an optional step 413, the ensemble 210 determines whether an object has been successfully identified. If the ensemble 210 determines that an object has been successfully identified, processing may continue at an optional step 414 (or, in the absence of such a step, at the step 418); otherwise, processing may continue at the optional step 416 (or, in the absence of such a step, at the step 418). In the absence of the step 413, processing may continue at an optional step 414 (or, in the absence of such a step, at the step 418).

At the optional step 414, the system 200 may carry out processing specific to the situation in which an object of the predetermined type is detected and identified in the current image $F_j$. For example, in the "broadcaster logo" scenario, the video sequence may be an unauthorized copy of a broadcaster's content and, if a broadcaster's logo is detected and identified, then measures may be taken in relation to that unauthorized copy (e.g. alerting the broadcaster associated with that logo). Processing then continues at the step 418.

At the step 418, one or more further actions may be taken. For example a log of the results of the method 400 may be updated (e.g. to store data indicating whether, for the frame $F_j$, an object of the predetermined type was detected and, if so, which object was identified). Likewise, at the step 418, processing may return to the step 402 at which a next image from the video sequence 202 may be processed—this next image may be the image $F_{j+1}$ (i.e. the immediate successor of the current image $F_j$) or some other image of the video sequence 202.

One advantage to using the particular structure for the system 200 illustrated in FIG. 2 when carrying out the method 400 of FIG. 4 is that: (a) a single neural network $NN_1$ is used to detect whether or not an object of the predetermined type is present, which does not consume as much processing resources as using an ensemble of neural networks; but (b) once an object of the predetermined type has been detected within the current image $F_j$ (which may be less often than every image from the video sequence 202), more processing resources can be applied to the task of identifying that object, via the ensemble 210 of neural networks $NN_{2,k}$ (k=1, 2, ..., M), with use of the ensemble 210 providing for a greater degree of accuracy. Use of the ensemble 210 helps prevent the system 200 becoming over-fitted based on the set of samples $S_1$. Together, this helps enable the system 200 perform object detection and identification/recognition for video sequences on a frame-by-frame basis, rather than having to combine, and wait for, results compiled across multiple video frames.

Figure 5:
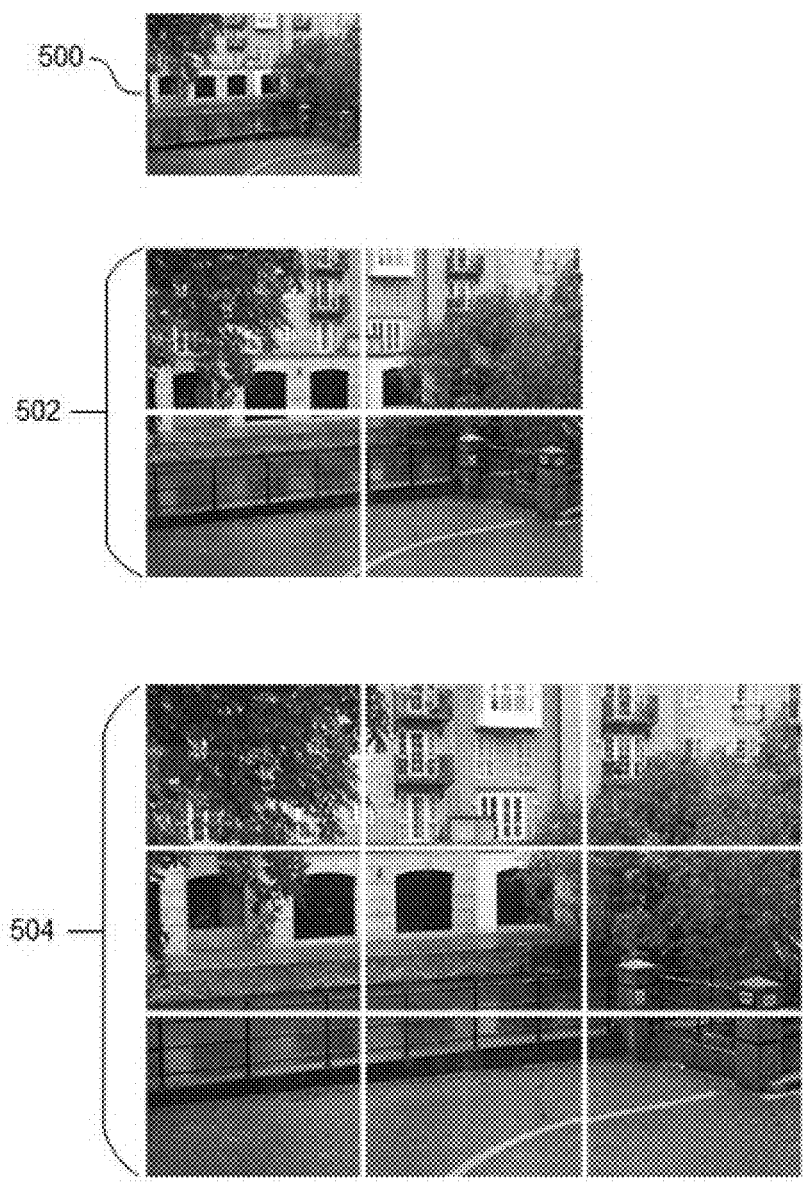
FIG. 5 schematically illustrates generation of candidate images by a candidate image generator according to some embodiments of the invention.

FIG. 5 schematically illustrates the generation of the candidate images $C_k$ (k=1, 2, ..., N) by the candidate image generator 206 at the optional step 404. The current image $F_j$ is shown as an image 500. Let the height of the image 500 be H and the width of the image 500 be W.

This image 500 may form one of the candidate images $C_k$.

Four candidate images 502 can be generated by dividing the original image 500 into four non-overlapping tiles of size H/2×W/2, and then resizing these tiles to the original dimensions H×W of the original image 500.

Nine candidate images 504 can be generated by dividing the original image 500 into nine non-overlapping tiles of size H/3×W/3, and then resizing these tiles to the original dimensions H×W of the original image 500.

It will be appreciated that this process can be used to form a hierarchy of candidate images $C_k$ at different levels. For a positive integer z, the $z^{th}$ level may be formed by dividing the original image 500 into $z^2$ non-overlapping tiles of size H/z×W/z, and then resizing these tiles to the original dimensions H×W of the original image 500 to form corresponding candidate images. Thus, the $1^{st}$ level comprises the original image 500, the $2^{nd}$ level comprises the images 502, the third level comprises the images 504, etc. The set of candidate images $C_k$ (k=1, 2, ..., N) may comprise images from one or more levels. In some embodiments, all levels from level 1 to Z are used for some positive integer Z, with all of the images at each of those levels being used as candidate images. However, this is not essential—some embodiments may make use of non-consecutive levels and/or some embodiments do not necessarily use all of the images from a given level as candidate images.

It will also be appreciated that different tiling schemes could be used. For example, some or all of the tiles used for any given level may be overlapping instead of non-overlapping, and/or the tiles need not necessarily be of the same size.

In some embodiments, one or more geometric transformations (e.g. shear, rotation, stretch, scaling, etc.) may be applied to the original image 500 before generating the tiles used for a given level of the hierarchy when generating some or all of the candidate images $C_k$ (k=1, 2, ..., N).

Preferably, the resultant candidate images $C_k$ are of the same size H×W.

In summary, each candidate image $C_k$ (k=1, 2, ..., N) is an image corresponding to an area of the original image 500 and that, if the candidate image $C_k$ is not the whole of the original image 500, has undergone one or more geometric transformations. Put another way, each candidate image $C_k$ (k=1, 2, ..., N) is a version of at least a part (or an area) of the original image 500. The set of candidate images $C_k$ (k=1, 2, ..., N) form a group of test images corresponding to the original image 500.

Use of the candidate image generator 206 and the step 404 helps to address various problems, including: the initial training sets $S_1$ and $S_2$ may have used images at a resolution that is different from the resolution of the images $F_j$ of the video sequence 202; the objects may be depicted in the samples of the initial training sets $S_1$ and $S_2$ at angles/orientations/positions different from how the objects are depicted in the images $F_j$ of the video sequence 202. Thus, use of the candidate image generator 206 and the step 404 helps to mitigate these differences between training and actual use, to thereby help improve the overall accuracy (from both a false positive and false negative perspective) of the system 200.

4—Example Use Cases

Figure 6:
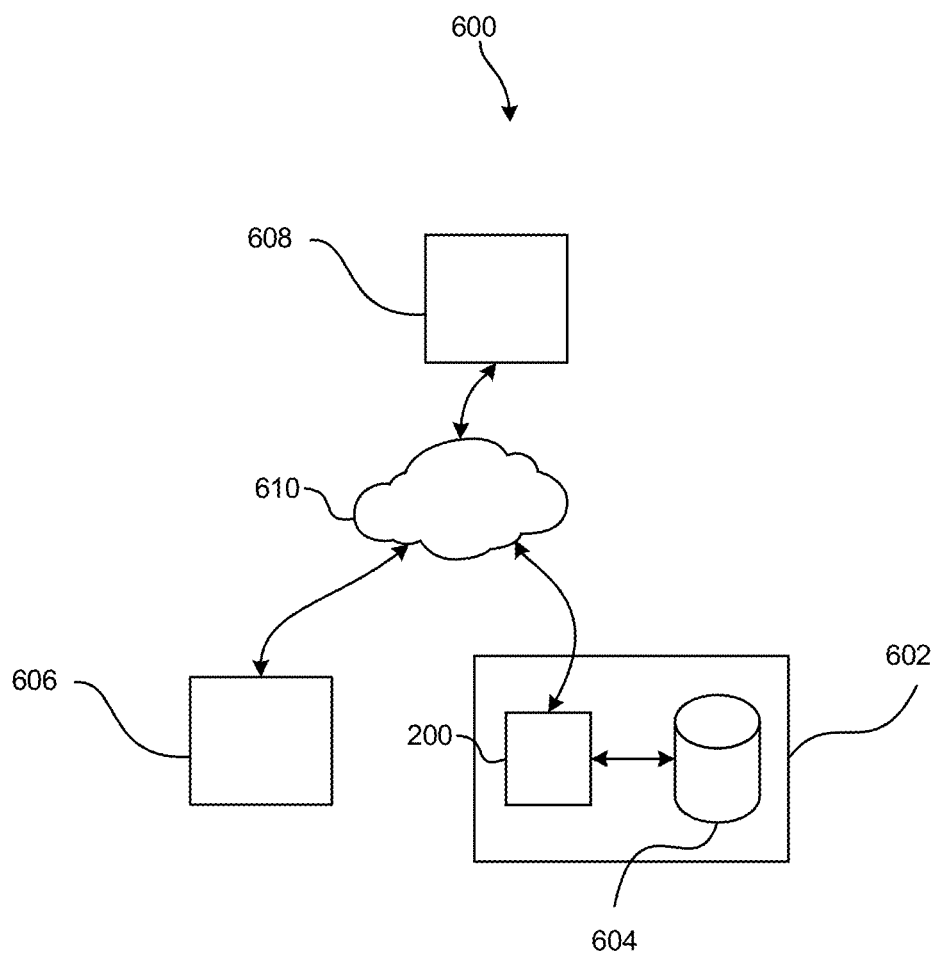
FIG. 6 schematically illustrates an example deployment scenario for the system of FIG. 2 according to some embodiments of the invention.

The system 200 and the method 400 may be used in various different ways and for various different purposes. FIG. 6 schematically illustrates an example deployment scenario 600 for the system 200 according to some embodiments of the invention.

The system 200 may form part of a larger system 602. The system 602 may comprise a database 604 (or repository or storage) for storing video sequences 202 to be analysed by the system 200. Thus the input 204 of the system 200 may obtain the current image $F_j$ from a video sequence 202 stored in the database 604.

Additionally or alternatively, the input 204 of the system 200 may be arranged to receive or obtain images $F_j$ of the video sequence 202 via a network 610 from a source 606 of the video sequence 202. Whilst FIG. 6 illustrates a single source 606, it will be appreciated that the system 200 may be arranged to receive or obtain images $F_j$ of video sequences 202 via one or more networks 610 from multiple sources 606. The network 610 may be any kind of data communication network suitable for communicating or transferring data between the source 606 and the system 200. Thus, the network 610 may comprise one or more of: a local area network, a wide area network, a metropolitan area network, the Internet, a wireless communication network, a wired or cable communication network, a satellite communications network, a telephone network, etc. The source 606 and the system 200 may be arranged to communicate with each other via the network 610 via any suitable data communication protocol. For example, when the network is the Internet, the data communication protocol may be HTTP. The source 606 may be any system or entity providing or supplying the video sequence 202. For example, the source 606 may comprise a television broadcaster, a digital television head-end, a cable or satellite television head-end, a web-based video-on-demand provider, a peer-to-peer network for sharing video sequences, etc. Thus the input 204 of the system 200 may obtain the current image $F_j$ from a video sequence 202 available from (or provided by) the source 606 via the network 610.

In some embodiments, the system 602 is arranged to obtain video sequences 202 via the network 610 from one or more sources 606 and store those video sequences 202 in the database 604 for subsequent analysis by the system 200.

In some embodiments, the entity interested in the results of the object detection and identification carried out by the system 200 is the operator of the larger system 602 and/or the source 606. However, additionally or alternatively, in other embodiments, one or more different entities 608 may be the entity interested in the results of the object detection and identification carried out by the system 200, in which case the results of the method 400 carried out by the system 200 may be communicated to the one or more entities 608 (e.g. via the network 610).

In some embodiments, as will be apparent from the discussion below, the source 606 of the video sequence 202 may be the same as the system 602.

Figure 7:
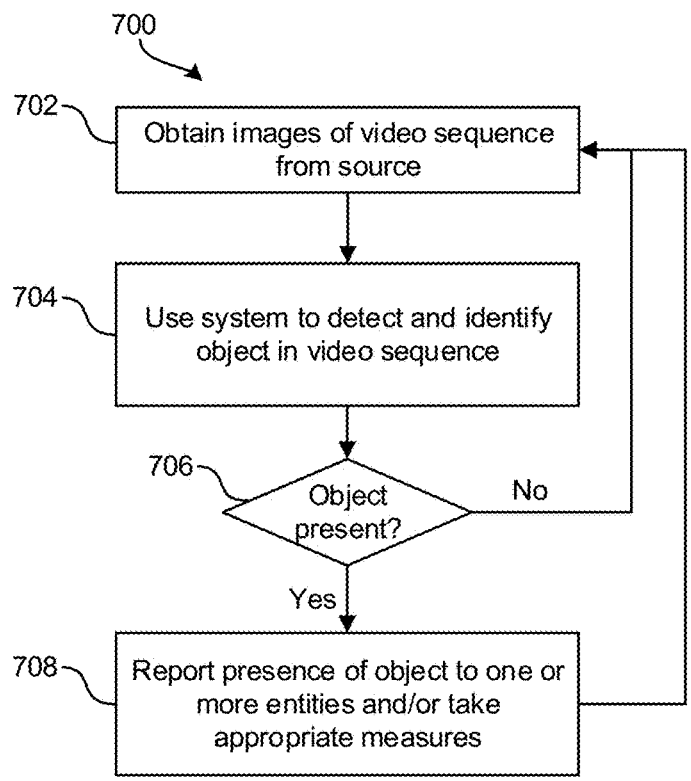
FIG. 7 is a flowchart illustrating an example method according to some embodiments of the invention.

FIG. 7 is a flowchart illustrating an example method 700 according to some embodiments of the invention.

At a step 702, images of a video sequence 202 are obtained from a source 606.

At a step 704, the system 200 is used to (try to) detect and identify an object depicted in the images of the video sequence 202.

If the system 200 does not detect and identify an object within the images of the video sequence 202, then at a step 706, processing is returned to the step 702 at which either further images of the video sequence 202 are obtained or at which images of a different video sequence 202 may be obtained. Alternatively, processing for the method 700 may be terminated.

If the system 200 does detect and identify an object within the images of the video sequence 202, then at a step 708, one or more entities may be informed that the identified object has been detected in a video sequence obtained from the source 606. Additionally or alternatively, one or more different measures may be taken. Processing is returned to the step 702 at which either further images of the video sequence 202 are obtained or at which images of a different video sequence 202 may be obtained. Alternatively, processing for the method 700 may be terminated.

In one example use-case scenario 600, the predetermined object type is a logo. The logo may be, for example, a logo of a television broadcaster, which is often depicted in (or overlaid onto) broadcast television images (usually in one of the corners of the images). Alternatively, the logo may be a logo indicating an origin of, or an owner of rights (e.g. copyright) in, the video sequence 202, or an indication of a channel for the television images. Thus, the system 200 may be used to test a video sequence 202 to see whether the source 606 of the video sequence 202 is authorized to provide that video sequence 202. Put another way, it may be known that the source 606 is not authorized to use video sequences 202 from a particular broadcaster or content provider, and the broadcaster or content/rights owner/provider may wish to check whether that source 606 is providing their video sequences 202. Thus, the system 200 may be used to detect and identify a logo depicted in a video sequence 202 obtained from a source 606. The set of objects $\{O_1, O_2, \ldots, O_T\}$ may therefore be a set of specific logos of interest (e.g. a set of logos of broadcasters or content/rights owners who wish to detect unauthorized use of their content). The video sequence 202 may, for example, be obtained at the system 200 in real-time (such as during a live broadcast or distribution by the source 606), or not in real-time, e.g. as a download from the source 606 (in which case the video sequence 202 may be stored in the database 604 for subsequent analysis by the system 200). If the system 200 identifies a logo in an image of the video sequence 202, then the system 200 may report to one or more entities (e.g. a television broadcaster associated with the identified logo; the owner of the copyright in the video as indicated by the identified logo; the police; etc.) that the video sequence 202 depicting that logo has been obtained from the source 606. Those one or more entities may then take appropriate measures, such as measures to prevent further broadcast/distribution of the video sequence 202, further investigation to gather more evidence regarding the unauthorized use/provision of video sequences, etc.

In one example use-case scenario 600, the predetermined object type is an advertiser logo (or brand or trade mark), for example, a logo displayed on sports clothing worn by athletes, hoardings, vehicles, etc. Advertisers may wish to know how often their advertising is shown in a video sequence (e.g. so that they can modify their advertising schemes or provide sponsorship payments accordingly). Thus, the system 200 may be used to detect and identify a logo depicted in a video sequence 202 obtained from a source 606. The set of objects $\{O_1, O_2, \ldots, O_T\}$ may therefore be a set of specific logos of interest (e.g. a set of logos of advertisers who wish to detect display of their advertising in video content). The video sequence 202 may, for example, be obtained at the system 200 in real-time (such as during a live broadcast or distribution by the source 606), or not in real-time, e.g. as a download from the source 606 (in which case the video sequence 202 may be stored in the database 604 for subsequent analysis by the system 200). If the system 200 identifies a logo in an image of the video sequence 202, then the system 200 may report to one or more entities (e.g. an advertiser associated with the logo) that the video sequence 202 depicting that logo has been obtained from the source 606. Those one or more entities may then take appropriate measures as set out above.

In one example use-case scenario 600, the predetermined object type is a human face. For example, for a video sequence 202 of a sports match (such as rugby or football), it may be desirable to identify which particular player(s) are being shown (e.g. to assist commentary, match statistics generation, metadata generation, etc). Likewise, the video sequence 202 may be the whole or part of a movie, and it may be desirable to identify which particular actor(s) are being shown (e.g. to assist in metadata generation, such as which actors are present in which scenes, how often an actor is on-screen, etc.). Likewise, the video sequence 202 may be footage from video cameras (such as CCTV cameras), and it may be desirable to detect whether or not particular people (e.g. wanted criminals, lost people, etc.) are being shown (e.g. to assist the police/authorities with their activities in finding particular people). Thus, the system 200 may be used to detect and identify a face depicted in a video sequence 202 obtained from a source 606. Indeed, the video sequence 202 may be provided by the same system 602 that operates the system 200—for example, a broadcaster may be generating live video of a sports event and may also be using the system 200 to identify competitors participating in that sports event. The set of objects $\{O_1, O_2, \ldots, O_T\}$ may therefore be a set of specific faces of interest (e.g. a set of faces of people of interest, e.g. known rugby players when the system is being used for analysis of rugby matches). The video sequence 202 may, for example, be obtained at the system 200 in real-time (such as during a live broadcast or distribution by the source 606), or not in real-time, e.g. as a download from the source 606 (in which case the video sequence 202 may be stored in the database 604 for subsequent analysis by the system 200). If the system 200 identifies a face in an image of the video sequence 202, then the system 200 may report this to one or more entities who may then take appropriate measures as set out above. In alternative embodiments, instead of training on a faces, the system 200 could be trained on a larger part of a person (e.g. the whole of a person), so that the predetermined type is then "person". The detection of people or faces may be used for any category of people, such as: actors and actresses, sports players, sports personalities, TV presenters, TV personalities, politicians, etc.

In one example use-case scenario 600, the predetermined object type is a type of animal (e.g. a mouse). For example, for a video sequence 202 of wildlife footage, it may be desirable to identify which animal(s) are being shown—for example, remote cameras may be used to try to capture footage of a rare animal, and the system 200 may be used to try to identify when images of such a rare animal have been captured. Thus, the system 200 may be used to detect and identify animals depicted in a video sequence 202 obtained from a source 606. The set of objects $\{O_1, O_2, \ldots, O_T\}$ may therefore be a set of specific animals of interest. The video sequence 202 may, for example, be obtained at the system 200 in real-time (such as during a live broadcast or distribution by the source 606), or not in real-time, e.g. as a download from the source 606 (in which case the video sequence 202 may be stored in the database 604 for subsequent analysis by the system 200). If the system 200 identifies an animal in an image of the video sequence 202, then the system 200 may, for example, generate corresponding metadata associated with the image.

It will be appreciated that the system 200 may be used to detect the presence of, and to identify, other types of object or events within the current image $F_j$, such as the depiction of a vehicle, a vehicle license/number plate, a person, a fire, a game character in video footage of a computer game, a score board in video footage of a sporting event, buildings (to thereby enable detection of locations associated with the video sequence 202—e.g. detecting the Eiffel Tower in the current image $F_j$ indicates that the current image $F_j$ is associated with Paris), etc.

In some embodiments, the input of the system 204 may be arranged to receive one or more single images instead of images from a video sequence 202. As mentioned, the system 200 may process images of a video sequence 202 on an image-by-image basis (i.e. independently of each other). Therefore, it will be appreciated that the system 200 could be used in situations in which the input data is just a single image. It will, therefore, be appreciated that the discussion above in relation to use of a video sequence 202 applies analogously to single images. For example, image content may be obtained from a webpage in order to analyse whether an advertiser's logo or trade mark is being used within that image content.

In some embodiments, the system 200 may be arranged to operate on other amounts of content. For example, the system 200 may be arranged to receive and process audio data as an amount of content instead of image or video data as amounts of content. In particular, the input of the system 204 may be arranged to receive one or more amounts of audio data (e.g. one second audio snippets from an audio stream) instead of one or more single images or instead of a video sequence 202. Thus, it will be appreciated that, in the description above, references to "video sequence" 202 may be replaced by references to "audio sequence" 202, and references to "image" may be replaced by "audio sample/snippet", etc. Thus, the neural networks $NN_1$ and $NN_{2,k}$ (k=1, 2, . . . , M) may have been trained on audio data samples, with a view to the first neural network $NN_1$ detecting the presence of an audio pattern or characteristic of a predetermined type within an amount of audio data and with a view to each of the second neural networks $NN_{2,k}$ (k=1, 2, . . . , M) identifying which audio pattern or characteristic of the predetermined type is present in the amount of audio data.

In one example use-case scenario 600, the predetermined object type is a voice or other type of noise/sound. For example, for an audio sequence 202, it may be desirable to identify which people are speaking—for example, in a radio broadcast, it may be desirable to identify which broadcasters are speaking, which music artists are being played, etc. As another example, for an audio sequence 202, it may be desirable to identify the sound of alarms, radio jingles (which could, for example, identify the specific source or rights holder of the audio sequence 202), or other events. Thus, the system 200 may be used to detect and identify voices or other noises depicted in an audio sequence 202 obtained from a source 606. The set of objects $\{O_1, O_2, \ldots, O_T\}$ may therefore be a set of specific voices or noises of interest. The audio sequence 202 may, for example, be obtained at the system 200 in real-time (such as during a live broadcast or distribution by the source 606), or not in real-time, e.g. as a download from the source 606 (in which case the audio sequence 202 may be stored in the database 604 for subsequent analysis by the system 200). If the system 200 identifies a voice or noise in sample of the audio sequence 202, then the system 200 may, for example, generate corresponding metadata associated with the sample.

In one example use-case scenario 600, the predetermined object type is a word or phrase. For example, for an audio sequence 202, it may be desirable to identify which particular words or phrases occur in the audio sequence 202 (e.g. to enable automatic subtitling, searching through content based on keywords, identifying when an event has occurred such as when a sports commentator shouts "Goal!", etc.). Thus, the system 200 may be used to detect and identify words present in an audio sequence 202 obtained from a source 606. The set of objects $\{O_1, O_2, \ldots, O_T\}$ may therefore be a set of specific words of interest. The audio sequence 202 may, for example, be obtained at the system 200 in real-time (such as during a live broadcast or distribution by the source 606), or not in real-time, e.g. as a download from the source 606 (in which case the audio sequence 202 may be stored in the database 604 for subsequent analysis by the system 200). If the system 200 identifies a word in sample of the audio sequence 202, then the system 200 may, for example, generate corresponding metadata associated with the sample, generate subtitles, provide search results, etc.

The content (video sequence 202, images and/or audio data) processed by the system 200 may originate from a variety of sources 606, including live or recorded content, computer generated content (such as game content), augmented reality, virtual reality, etc.

Thus, the system 200 may be used in a variety of way, including:
 generating metadata from content
 detecting the broadcaster or channel associated with content
 detecting people, game characters, etc. in content
 detecting location in, or associated with, content
 detecting logos, brands and/or advertising in content, which may, for example, be used to facilitate measuring brand impact in content or measuring advertising impact in content
 detecting fraudulent advertising
 detecting pirated content
 finding fraudulent goods and services by identifying such goods/services in images or video, i.e. brand protection
 video annotation based on the detection and identification of audio or visual events
 identifying TV, movie and sports content
 annotation of TV, movie and sports content
 searching through content using keywords, phrases, etc. (e.g. searching through footage of a sports match to identify when a commentator said "Goal" or mentioned a particular player by name)
 searching through video based on the appearance of a person or character
 identifying a movie or video based upon the appearance of characters on screen.

5—Modifications

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or one or more graphical processing units (GPUs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method for identifying an object within a video sequence, wherein the video sequence comprises a sequence of images, wherein the method comprises:
    obtaining the video sequence from a source;
    for each of one or more images of the sequence of images:
    using a first neural network to determine whether or not an object of a predetermined type is depicted within the image; and
    in response to the first neural network determining that an object of the predetermined type is depicted within the image, using an ensemble of second neural networks to identify which object of the predetermined type is depicted within the image;
    wherein one or both of: (a) the first neural network is a convolutional neural network or a deep convolutional neural network; and (b) one or more of the second neural networks is a convolutional neural network or a deep convolutional neural; and
    determining unauthorized use of the video sequence based on identifying that the object of the predetermined type is depicted within one or more images of the video sequence.

2. The method of claim 1, wherein using a first neural network to determine whether or not an object of a predetermined type is depicted within the image comprises:
    generating a plurality of candidate images from the image;
    using the first neural network to determine, for each of the candidate images, an indication of whether or not an object of the predetermined type is depicted in said candidate image; and
    using the indications to determine whether or not an object of the predetermined type is depicted within the image.

3. The method of claim 2, wherein one or more of the candidate images is generated from the image by performing one or more geometric transformations on an area of the image.

4. The method of claim 1, wherein the predetermined type is a logo.

5. The method of claim 4, wherein the logo is one of a plurality of predetermined logos.

6. The method of claim 1, wherein the predetermined type is a face or a person.

7. The method of claim 1, comprising associating metadata with the image based on the identified object.

8. A method for identifying an object within an amount of content, the method comprising:
    obtaining the amount of content from a source;
    using a first neural network to determine whether or not an object of a predetermined type is depicted within the amount of content;
    in response to the first neural network determining that an object of the predetermined type is depicted within the amount of content, using an ensemble of second neural networks to identify which object of the predetermined type is depicted within the amount of content; and
    determining unauthorized use of the amount of content based on identifying that the object of the predetermined type is depicted within the amount of content;
    wherein one or both of: (a) the first neural network is a convolutional neural network or a deep convolutional neural network; and (b) one or more of the second neural networks is a convolutional neural network or a deep convolutional neural.

9. The method of claim 8, wherein the amount of content is one of: (a) an image; (b) an image of a video sequence that comprises a sequence of images; and (c) an audio snippet.

10. The method of claim 8, wherein one or both of: (a) the first neural network is a convolutional neural network or a deep convolutional neural network; and (b) one or more of the second neural networks is a convolutional neural network or a deep convolutional neural network.

11. The method of claim 8, wherein using a first neural network to determine whether or not an object of a predetermined type is depicted within the amount of content comprises:
    generating a plurality of content candidates from the amount of content;
    using the first neural network to determine, for each of the content candidates, an indication of whether or not an object of the predetermined type is depicted in said content candidate; and
    using the indications to determine whether or not an object of the predetermined type is depicted within the amount of content.

12. The method of claim 11, wherein one or more of the content candidates is generated from the amount of content by performing one or more geometric transformations on a portion of the amount of content.

13. The method of claim 8, wherein the amount of content is an audio snippet and the predetermined type is one of: a voice; a word; a phrase.

14. The method of claim 8, comprising associating metadata with the amount of content based on the identified object.

15. An apparatus comprising one or more processors, the one or more processors being arranged to carry out identification of an object within an amount of content, said identification comprising:
   obtaining the amount of content from a source;
   using a first neural network to determine whether or not an object of a predetermined type is depicted within the amount of content;
   in response to the first neural network determining that an object of the predetermined type is depicted within the amount of content, using an ensemble of second neural networks to identify which object of the predetermined type is depicted within the amount of content; and
   determining unauthorized use of the amount of content based on identifying that the object of the predetermined type is depicted within the amount of content;
   wherein one or both of: (a) the first neural network is a convolutional neural network or a deep convolutional neural network; and (b) one or more of the second neural networks is a convolutional neural network or a deep convolutional neural.

16. The apparatus of claim 15, wherein the amount of content is one of: (a) an image (b) an image of a video sequence that comprises a sequence of images; and (c) or an audio snippet.

17. A non-transitory computer-readable medium storing a computer program which, when executed by one or more processors, causes the one or more processors to carry out identification of an object within an amount of content, said identification comprising:
   obtaining the amount of content from a source;
   using a first neural network to determine whether or not an object of a predetermined type is depicted within the amount of content;
   in response to the first neural network determining that an object of the predetermined type is depicted within the amount of content, using an ensemble of second neural networks to identify which object of the predetermined type is depicted within the amount of content; and
   determining unauthorized use of the amount of content based on identifying that the object of the predetermined type is depicted within the amount of content;
   wherein one or both of: (a) the first neural network is a convolutional neural network or a deep convolutional neural network; and (b) one or more of the second neural networks is a convolutional neural network or a deep convolutional neural.

18. The non-transitory computer-readable medium of claim 17, wherein the amount of content is one of: (a) an image (b) an image of a video sequence that comprises a sequence of images; and (c) or an audio snippet.

\* \* \* \* \*